United States Patent [19]

Van Ochten

[11] Patent Number: 5,679,069

[45] Date of Patent: Oct. 21, 1997

[54] DEVICE FOR REMOVING THE ANUS OF SLAUGHTERED ANIMALS

[75] Inventor: Sander Antonie Van Ochten, Lichtenvoorde, Netherlands

[73] Assignee: Stork R.M.S. B.V., Netherlands

[21] Appl. No.: 592,941

[22] Filed: Jan. 29, 1996

[30] Foreign Application Priority Data

Jan. 30, 1995 [NL] Netherlands ............... 9500164

[51] Int. Cl.$^6$ .................................................. A22B 5/00
[52] U.S. Cl. ........................................ 452/122; 452/120
[58] Field of Search ............................... 452/122, 120

[56] References Cited

U.S. PATENT DOCUMENTS

| | | | |
|---|---|---|---|
| 4,087,886 | 5/1978 | Aubert | 452/122 |
| 5,112,272 | 5/1992 | Andersen | 452/120 |
| 5,120,266 | 6/1992 | Aubert | 452/120 |
| 5,354,231 | 10/1994 | Te Dorsthorst et al. | 452/122 |
| 5,419,738 | 5/1995 | Lysbo et al. | 452/120 |
| 5,499,390 | 3/1996 | Van Ochten et al. | 452/120 |

FOREIGN PATENT DOCUMENTS

| | | |
|---|---|---|
| 2640465 | 6/1990 | France . |
| 7606104 | 6/1976 | Germany . |
| 9300686 | 11/1994 | Germany . |
| 9307759 | 4/1993 | WIPO . |

*Primary Examiner*—Willis Little
*Attorney, Agent, or Firm*—Webb Ziesenheim Bruening Logsdon Orkin & Hanson, P.C.

[57] ABSTRACT

A device for removing the anus of a slaughtered animal comprising:

a carriage translatable in at least one direction by means of first translation means;

a cutting device supported by the carriage and comprising a substantially cylindrical blade with a leading cutting edge, which device is drivable for rotation round its axis by means of drive means and drivable for axial translation by means of second translation means; and a sensor carried by the carriage for detecting contact between the cutting device and an animal for processing during operation of the first translation means, which sensor is connected in order to render inoperative the first translation means when said contact is detected and, if required, to activate the drive means for the said rotating drive and to activate the second translation means for forward axial translation of the cutting device over a chosen distance, followed by backward axial translation of the cutting device until this latter is situated out of contact with the slaughtered animal.

9 Claims, 4 Drawing Sheets

DEVICE FOR REMOVING THE ANUS OF SLAUGHTERED ANIMALS

The international patent application PCT/NL92/00157 relates to a device for removing the anus of slaughtered animals. Detection of the groin area of the slaughtered animal can take place in order to position a cutting device in vertical position for this purpose. The technique according to this international publication is based on the assumption that the groin occupies at least approximately a fixed, in any case known spatial position relative to the anal orifice. It has been found however that the variation in this dimension is so great that the cutting precision leaves something to be desired.

The as yet unpublished Netherlands patent application NL 93.00686 likewise relates to the removal of the anus of slaughtered animals. In this known device a controlling of the cutting blade takes place such that the cutting edge of the blade follows substantially the shape of the rectum of the slaughtered animal while avoiding contact with bone. Because the distance between the groin and the anal orifice is not constant, according to this Netherlands patent application the cutting blade will undergo a certain tilting when it comes into contact with the tail or penetrates into the anal orifice of the slaughtered animal. The consequence hereof is that the angle at which the cutting out of the anus is started is not constant. It is noted here that it is however permitted for the angular position of the blade to vary during the cutting operation and this position depends on the anatomy of the slaughtered animal.

The invention has for its object to provide a device with which, using simple means, is achieved that the accuracy of the cutting operation is improved in relation to the known art.

A further object of the invention is to provide a device wherein the cutting edge of the blade can substantially follow the rectum of the slaughtered animal while avoiding contact with bone.

These and other objectives are realized with a device for removing the anus of a slaughtered animal, which device comprises:

a carriage translatable in at least one direction by means of first translation means;

a cutting device supported by the carriage and comprising a substantially cylindrical blade having a leading cutting edge, which device is drivable for rotation round its center line by means of drive means and drivable for axial translation by means of second translation means; and a sensor carried by the carriage for detecting contact between the cutting device and an animal for processing during the operation of the first translation means, which sensor is connected in order to render inoperative the first translation means when said contact is detected and, if required, to activate the drive means for the said rotating drive and to activate the second translation means for forward axial translation of the cutting device over a chosen distance, followed by backward axial translation of the cutting device until this latter is situated out of contact with the slaughtered animal.

In this basic embodiment of the device according to the invention the first translation means are adapted such that the blade approaches with reasonable accuracy the zone for processing of the animal.

The first translation means provide a preliminary approach. Once arrival in the desired area has taken place on the basis of this preliminary approach, the operation of the first translation means is stopped. The drive means for rotatable driving of the cutting device are then set into operation or kept in operation, whereafter the second translation means are activated, whereby the cutting device becomes operational such that the cylindrical blade is carried forward along its center line, whereby the effective cutting out operation of the anus of the slaughtered animal can take place.

The approach accuracy is preferably increased, which improves the total precision of the process. To this end the device according to the invention can have the special feature that the carriage is translatable by means of the first translation means in at least two independent directions; and arrival detection means are present which are coupled to the first translation means such that the carriage is displaced toward the slaughtered animal in a first direction, for instance one of the independent directions, until the arrival detection means of the cutting device detect arrival at a known zone of the animal, for instance the back, whereafter the displacement of the carriage in this first direction is ceased immediately and the cutting device is then displaced in a second direction until the sensor detects contact between the cutting device and the animal.

The arrival detection means can be of any suitable type, for instance be embodied mechanically, optically, capacitively, ultrasonically or in other known manner.

An embodiment in which the sensor comprises a force sensor which is added to the cutting device and which is adapted to detect an external force exerted on this cutting device, for instance on the blade, in particular the leading side thereof, has the advantage that the blade and the sensor form an integrated unit, which can be recommended from the viewpoint of hygiene and ease of cleaning.

A simple and reliable embodiment has the special feature that the cutting device is displaceable from a rest position counter to the action of the spring means and the force sensor comprises a movement sensor which is adapted to detect a displacement consisting of a rotation and/or a translation of the cutting device counter to the action of the spring means.

A specific embodiment has the special feature that the cutting device comprises a pin which is placed coaxially with the blade and which has a preferably rounded end protruding beyond the cutting edge.

The described embodiment in which the carriage is translatable by means of the first translation means in at least two independent directions can advantageously display the special feature that the two directions extend in the median plane of the animal.

The device may comprise suspension means for suspending, for instance on the hind legs, a slaughtered animal for processing. In this case the median plane of the animal is very well defined for the above described embodiment, which enhances the approach accuracy. In another embodiment the device comprises carrying means for carrying in lying position a slaughtered animal for processing. In this case there is the possibility of the median plane of the animal being less well defined and special attention having to be paid to the approach accuracy.

The device according to the invention will generally operate such that the cutting device first roughly approaches the required position, or assumes a fixed angular position and/or position relative thereto in order to then approach the target area with increased accuracy in order to begin the cutting operation.

The first and the second direction can correspond for instance with respectively a vertical and horizontal direction or respectively a horizontal and vertical direction.

The detection of the arrival of the cutting device at the processing location can take place in any desired appropriate manner. The said sensor can be embodied mechanically, optically, capacitively or ultrasonically. Particularly in the case of the described force sensor, this latter will be embodied such that only after a determined force has been exceeded or a predetermined angular position overstepped or change of location a detection signal will be generated by the sensor to render inoperative the first translation means and, if required, to activate the drive means.

The invention will be elucidated hereinafter with reference to the annexed drawings, wherein.

Figure 1:
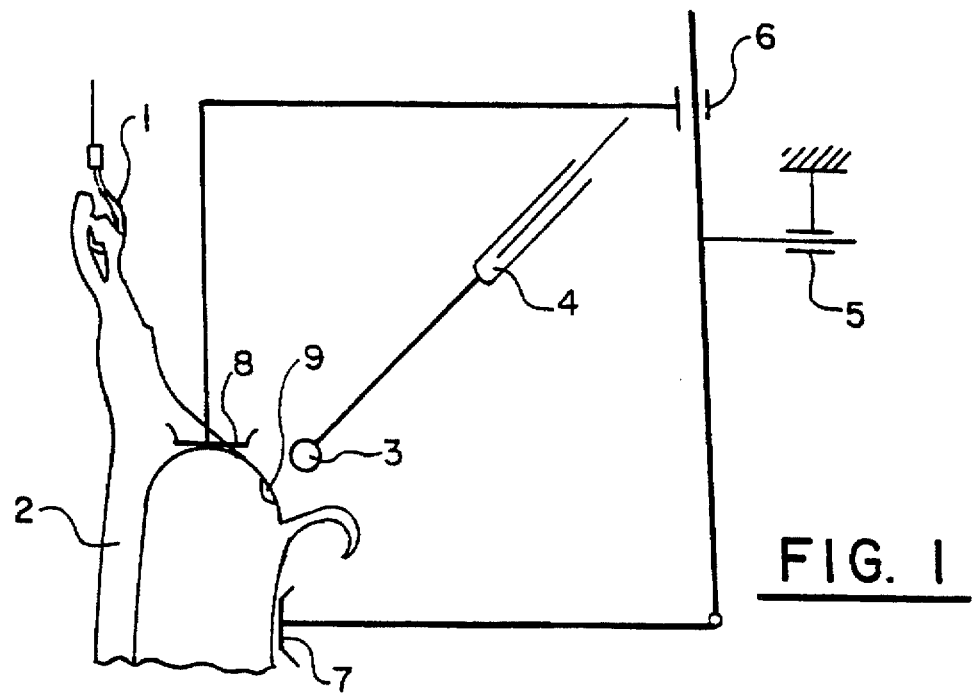
FIG. 1 shows a highly schematized side view of a device for removing the anus of slaughtered animals.

FIG. 1 shows a pig 2 suspended from its hind legs by means of suspension hooks 1. A cutting device 3 is movable at a fixed direction of entry by means of a linear drive 4. The drive 4 with the cutting device 3 form part of a carriage which is movable in the horizontal plane by a horizontal guiding 5 and associated drive means (not drawn). The carriage further bears a vertical guiding 6 with associated drive (not drawn) for vertical displacement of the cutting device 3 so that it is carried into a position relative to the sensor 7 of the slaughtered pig 2 such that the center line of the cutting device 3 extends to the anus 9 of the slaughtered animal 2.

Schematically designated positioning sensors 7 and 8 determine the desired position. The positioning sensors 7 and 8 comprise arrival detection means.

Figure 2:
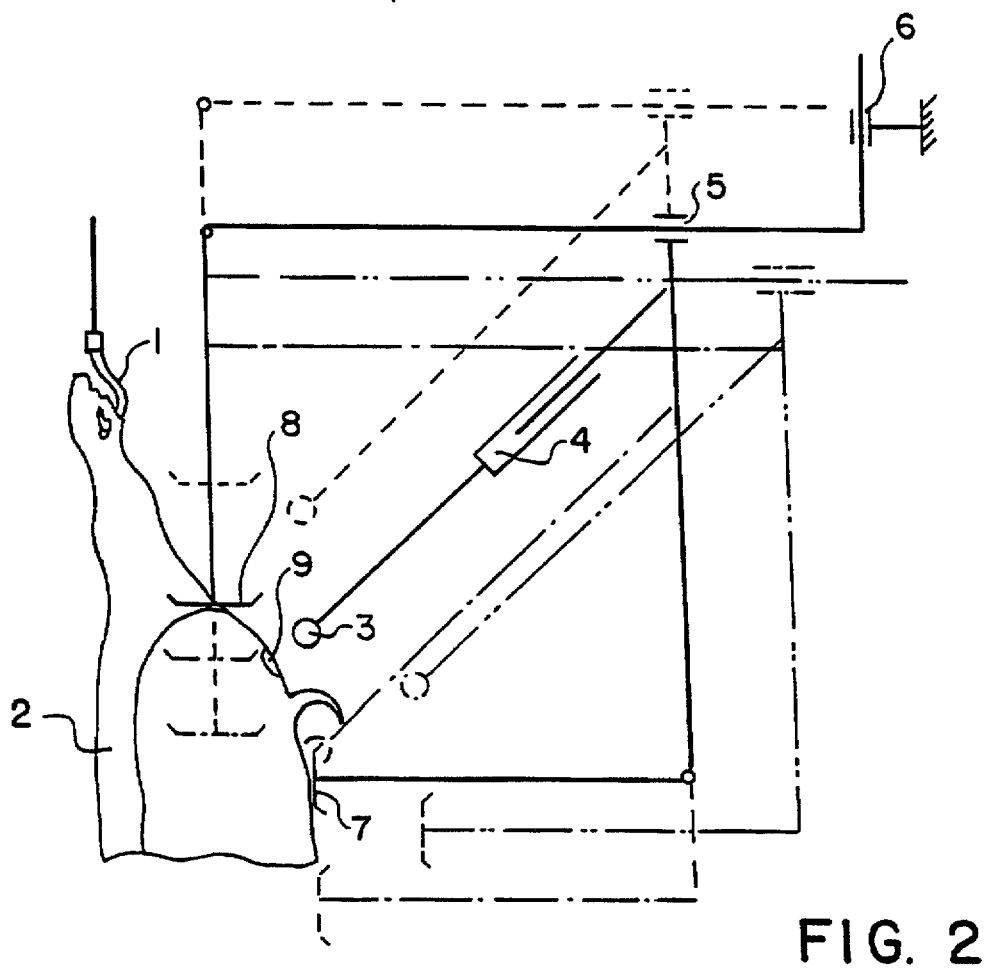
FIG. 2 shows a second embodiment in highly schematic side view.

In the embodiment according to FIG. 2 the unit 3, 4, 5, 7, 8 is vertically displaceable in its entirety via the vertical guiding 6, while the movement of the cutting device with the linear drive 4 takes place by means of the horizontal guiding 5.

FIG. 2 shows that it is always possible, irrespective of the dimensions of the pig 2 (long-short; thin-fat), to place the cutting device 3 in the correct position relative to the anus 9.

Figure 3:
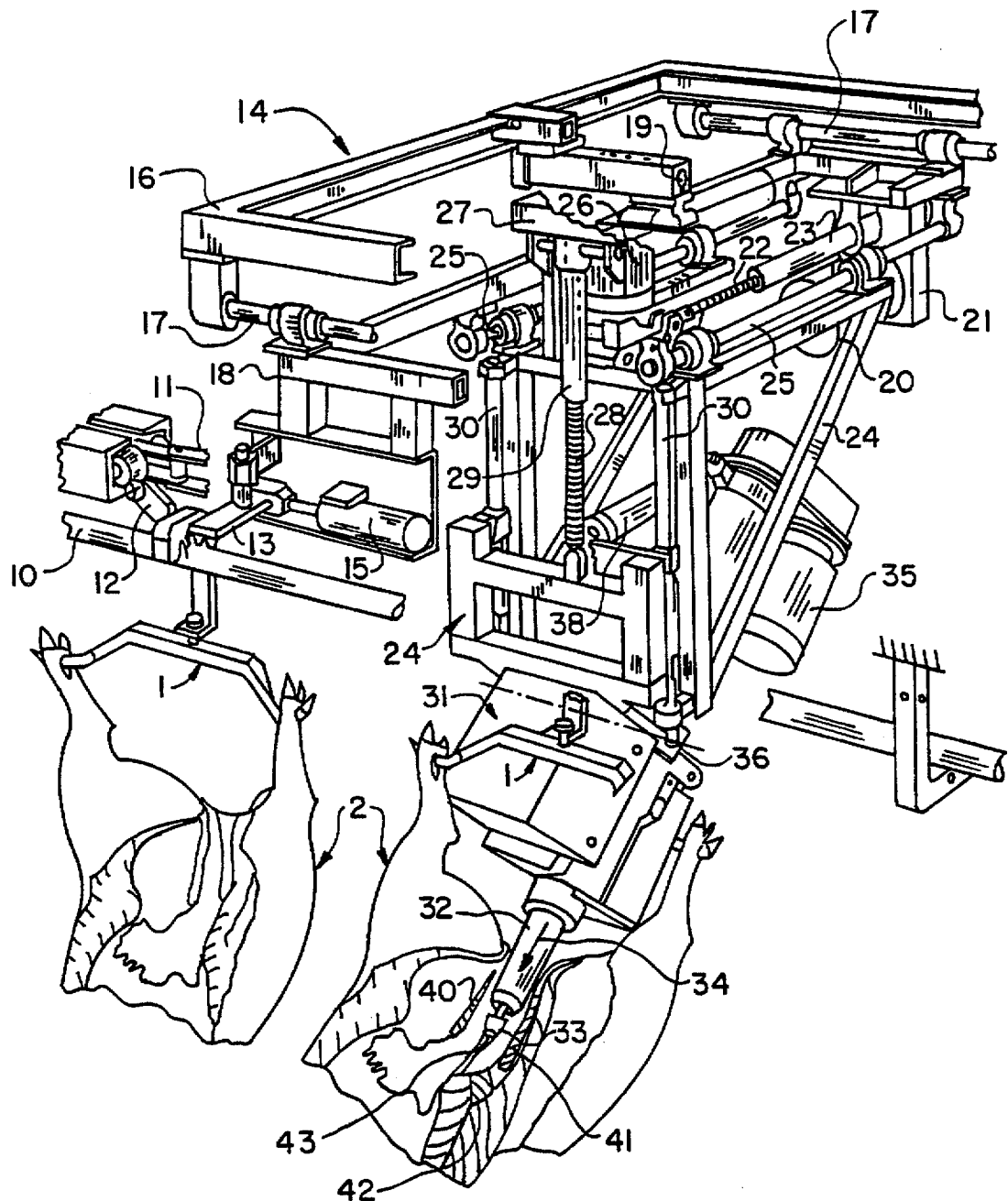
FIG. 3 shows a partly broken away perspective view of a device according to the invention.

FIG. 3 shows the hook 1 which is slidable over a rail 10 and driven by a drive chain 11 by means of carriers 12. The device 14 according to the invention can be carried along by the hook 1 by means of a carrier 13 such that during the cutting operation by the cutting device 14 the animal 2 stands still in relation to the device.

A fixed frame 16 supports via guides 17 an auxiliary frame 18 which is movable in lengthwise direction of the rail 10 by means of a linear drive 19. This drive serves for the horizontal movement of auxiliary frame 18 along rail 10.

A motor 20 drives via a transmission 21 a screw spindle 22 which, by means of an associated pipe with internal threading 23, horizontally drives a carriage 24 in a direction from and to the rail 10. The guiding takes place via horizontal guides 25 which correspond with the guide 5 as according to FIG. 1.

The vertical mobility is obtained by means of a motor 26, an associated transmission 27 and a screw spindle 28 with pipe 29 with internal screw thread guides 30 ensure the vertical guiding and correspond with the vertical guide 6 according to FIG. 1.

The carriage 24 bears the cutting device 14 with the frame 31, from which protrudes a cylindrical blade 32 with blunt locating pin 33. Coupled to the frame 31 is a drive motor 35 for the blade 32 in addition to a linear drive (not drawn) to set the blade into motion in axial direction 34.

Not drawn are measuring means for measuring the position of the cutting device relative to the anus 9, or the control means which process the output signals of these measuring means into control signals for the respective motors and drives.

FIG. 3 further shows that the frame 31, and therewith the blade 32, is connected to the carriage 24 via a pivot center line 36. Frame 31 can thus swing round the pivot center line 36. To control the swinging movement of frame 31, and therewith blade 32, a pneumatic cylinder 38 is placed between carriage 24 and frame 31, which cylinder is connected to a controllable source (not drawn) of gas under pressure.

Figure 4:
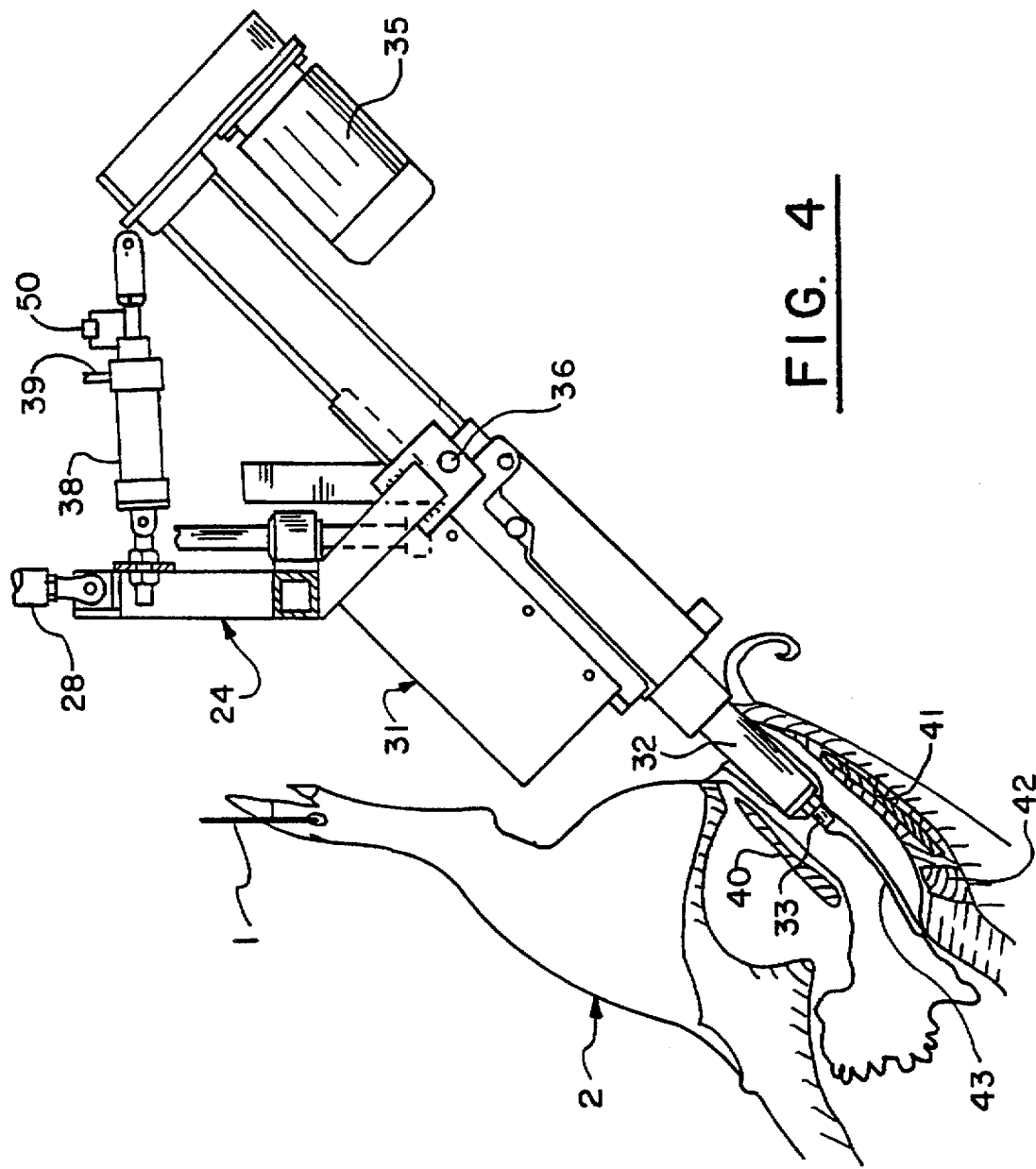
FIG. 4 shows a partly broken away side view of the device according to FIG. 3 in the starting position.

In the starting position shown in FIG. 4, which corresponds with the position shown in FIG. 3, medium under a pressure of about 6 bar is supplied to cylinder 38 via a pressure conduit 39. This cylinder thereby lies in a starting or rest position in which the blade in this case assumes the angular position shown in FIG. 4. It is noted that in the foregoing is already described the manner in which blade 32 can be placed correctly in the position to begin the cutting operation.

Figure 5:
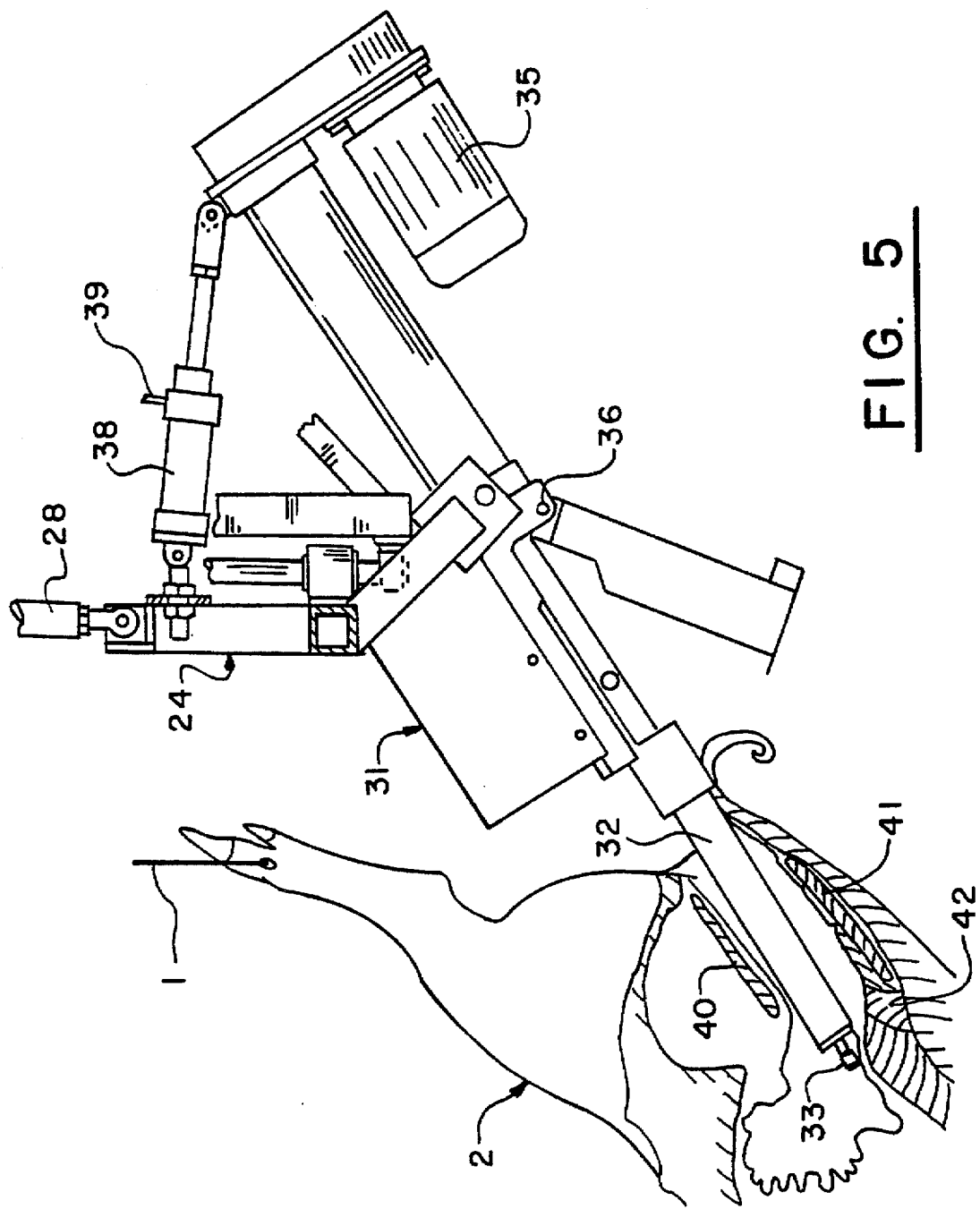
FIG. 5 shows a view corresponding with FIG. 4 of the device in a later stage of the cutting operation.

Via pressure conduit 39 gas at a decreased pressure, for instance in the order of 1 bar, is now supplied to the pneumatic cylinder whereby the pneumatic cylinder begins to act as a gas pressure spring and can pivot the blade 32 round pivot axis 36. When the cutting operation has begun, not only is blade 32 set into rotation by the motor 35 but a linear displacement of blade 32 also takes place, wherein this latter is moved in axial direction relative to the frame. Shown schematically in FIGS. 3, 4 and 5 are the pubic bone 40, the tailbone 41 and the backbone 42. Due to the resilient hingeability of blade 32 the rectum 43 can be effectively followed by the locating pin 33 under the guidance of these hard parts 40, 41, 42, so that the rectum can be cut out very accurately.

Prior to the cutting operation detection of the back takes place by means of a suitable sensor, for instance a mechanical or optical sensor. General reference is made in this respect to the schematic FIGS. 1 and 2 in which this back sensor is designated with the reference numeral 7. Detection of the back takes place during the horizontal displacement of blade 32. When the back is detected the horizontal displacement is stopped, whereafter the vertical displacement is started. The blunt locating pin 33 now comes into contact with the anal orifice or the tail, whereby the pin is stopped and the blade 32, as according to the foregoing, can undergo a slight tilting. This tilting is sensed by a sense, such as an approach switch 50, thereby detecting contact between the cutting device and the slaughtered animal. This latter immediately interrupts the vertical displacement and sets blade 32 into rotating and axial movement.

I claim:

1. A device for removing the anus of a slaughtered animal, which device comprises:

first translation means;

a carriage translatable in at least one direction by the first translation means;

drive means;

second translation means;

a cutting device supported by the carriage and comprising a substantially cylindrical blade with a leading cutting edge, which device is drivable for rotation round its center line by the drive means and drivable for axial translation by the second translation means; and a sensor carried by the carriage for detecting contact between the cutting device and the slaughtered animal during operation of the first translation means, which sensor is configured to at least one of render inoperative the first translation means when contact with the slaughtered animal is detected, activate the drive means and activate the second translation means for forward axial translation of the cutting device over a chosen distance, followed by backward axial translation of the cutting device until the cutting device is situated out of contact with the slaughtered animal.

2. A device as claimed in claim 1, wherein the carriage is translatable by the first translation means in at least two independent directions; and the device further includes arrival detection means coupled to the first translation means such that the carriage is displaced toward the slaughtered animal in a first direction until the arrival detection means detects arrival at a known zone of the animal whereafter the displacement of the carriage in this first direction is ceased immediately and the cutting device is then displaced in a second direction until the sensor detects contact between the cutting device and the animal.

3. A device as claimed in claim 1, wherein the sensor comprises a force sensor which is added to the cutting device and which is adapted to detect an external force exerted on the cutting device.

4. A device as claimed in claim 3, wherein the cutting device is displaceable from a rest position counter to the action of a spring means and the force sensor comprises a movement sensor which is adapted to detect a displacement consisting of at least one of a rotation and a translation of the cutting device counter to the action of the spring means.

5. A device as claimed in claim 1, wherein the cutting device comprises a pin which is placed coaxially with the blade and which has a rounded end protruding beyond the cutting edge.

6. A device as claimed in claim 2, wherein the two directions extend in a median plane of the animal.

7. The device as claimed in claim 2, wherein the known zone is the back of the slaughtered animal.

8. The device as claimed in claim 3, wherein the force sensor is adapted to detect external force on the blade.

9. The device as claimed in claim 8, wherein the force sensor is adapted to detect external force on a leading side of the blade.

* * * * *

UNITED STATES PATENT AND TRADEMARK OFFICE
CERTIFICATE OF CORRECTION

PATENT NO.   : 5,679,069
DATED        : October 21, 1997
INVENTOR(S)  : Sander Antonie Van Ochten It is certified that error appears in the above-identified patent and that said Letters Patent is hereby corrected as shown below:

```
Column 3 Line 63 "screw thread guides 30" should read
--screw thread.  Guides 30--.

Column 4 Line 19 "pressure of about 6 bar" should read
--pressure of about 6 bar-- (delete bold).

Column 4 Line 51 "by a sense" should read --by a sensor--.
```

Signed and Sealed this

Seventeenth Day of February, 1998

Attest:

BRUCE LEHMAN

*Attesting Officer*        *Commissioner of Patents and Trademarks*